United States Patent
Brenninger

(10) Patent No.: US 11,919,374 B2
(45) Date of Patent: Mar. 5, 2024

(54) METHOD FOR PRODUCING A MOTOR VEHICLE, PARTICULARLY A CAR

(71) Applicant: Bayerische Motoren Werke Aktiengesellschaft, Munich (DE)

(72) Inventor: Andreas Brenninger, Geisenhausen (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 277 days.

(21) Appl. No.: 17/282,509

(22) PCT Filed: Sep. 11, 2019

(86) PCT No.: PCT/EP2019/074159
§ 371 (c)(1),
(2) Date: Apr. 2, 2021

(87) PCT Pub. No.: WO2020/069826
PCT Pub. Date: Apr. 9, 2020

(65) Prior Publication Data
US 2022/0001726 A1    Jan. 6, 2022

(30) Foreign Application Priority Data
Oct. 5, 2018 (DE) .................. 10 2018 124 560.2

(51) Int. Cl.
*B60J 5/04* (2006.01)
*B60J 1/00* (2006.01)
(Continued)

(52) U.S. Cl.
CPC ............ *B60J 5/0468* (2013.01); *B60J 1/005* (2013.01); *B60R 13/04* (2013.01); *B62D 25/04* (2013.01); *B62D 65/06* (2013.01)

(58) Field of Classification Search
CPC ............ B60J 1/004; B60J 1/005; B62D 65/06
See application file for complete search history.

(56) References Cited

U.S. PATENT DOCUMENTS

| 4,416,088 A | 11/1983 | Feucht et al. |
| 2012/0216965 A1 | 8/2012 | Castagnola et al. |
| 2017/0021882 A1* | 1/2017 | Vanderpool .......... B62D 65/026 |

FOREIGN PATENT DOCUMENTS

| CN | 108463366 A | 8/2018 |
| CN | 108495973 A | 9/2018 |

(Continued)

OTHER PUBLICATIONS

Machine translation of DE-102010032084-A1 (Year: 2011).*
(Continued)

*Primary Examiner* — Kyle A Cook
(74) *Attorney, Agent, or Firm* — Crowell & Moring LLP

(57) ABSTRACT

A method for producing a motor vehicle in which a front door and a rear door are mounted on the same side of a bodyshell. Then the doors are removed. The doors are then pre-assembled while the doors are removed. During the pre-assembly of the doors, the front door is fitted with a first side window and with a first trim, the rear door is fitted with a second side window and with a second trim, the second trim is finally positioned relative to the rear door and the second side window is finally positioned relative to the second trim. The doors are then mounted on the side, whereupon the first trim is finally positioned relative to the second trim and the first side window is finally positioned relative to the first trim while the doors are fitted to the side.

8 Claims, 3 Drawing Sheets

(51) Int. Cl.
  *B60R 13/04*  (2006.01)
  *B62D 25/04*  (2006.01)
  *B62D 65/06*  (2006.01)

(56) References Cited

FOREIGN PATENT DOCUMENTS

| | | | |
|---|---|---|---|
| DE | 30 04 897 C2 | 8/1981 | |
| DE | 42 33 267 C2 | 4/1994 | |
| DE | 10 2010 032 084 A1 | 3/2011 | |
| EP | 2 492 123 A1 | 8/2012 | |
| FR | 2844246 A1 * | 3/2004 | ............ B60J 5/0408 |
| GB | 2557664 A | 6/2018 | |
| WO | WO 2018/109007 A1 | 6/2018 | |

OTHER PUBLICATIONS

Machine Translation of FR-2844246-A1 (Year: 2004).*
PCT/EP2019/074159, International Search Report dated Dec. 13, 2019 (Two (2) pages).
German Search Report issued in German application No. 10 2018 124 560.2 dated Aug. 21, 2019, with Statement of Relevancy (Ten (10) pages).
English-language Chinese Office Action issued in Chinese application No. 201980052312.8 dated May 11, 2023 (Six (6) pages).

* cited by examiner

METHOD FOR PRODUCING A MOTOR VEHICLE, PARTICULARLY A CAR

BACKGROUND AND SUMMARY OF THE INVENTION

The invention relates to a method for producing a motor vehicle, particularly a car.

DE 30 04 897 C2 discloses a side door for a car, having a door frame which accommodates hinge and lock parts and to which a door outer paneling and an interior door trim are fixed in such a way that the door outer paneling can be fitted without removing the interior door trim.

DE 42 33 267 C2 in addition discloses a method for adjusting a frameless side window, lowerable in a vehicle door. Here a window glass holder can be positioned in relation to a driver and then fixed, for which purpose the window glass holder and the driver are provided with interacting saw-tooth profiles.

The object of the present invention is to create a method by means of which trims and side windows for side doors of motor vehicles can be positioned in a particularly time-saving and cost-effective manner, so that the vehicle in question has an especially advantageous visual appearance.

An outstanding feature of the method according to the invention for producing a motor vehicle, preferably in the form of a car, is a first step, also referred to as step a). In the first step a front door is mounted on one side of an integral bodyshell of the motor vehicle. The front door here comprises a first window frame which defines a first window aperture for a first side window. In addition, in the first step a rear door is mounted on the side of the bodyshell, that is to say to the same side as the front door, so that both the front door and the rear door are mounted on the same side of the integral bodyshell and therefore on the integral bodyshell on that side. The rear door comprises a second window frame, which defines a second window aperture for a second side window. The front door and the rear door are also referred to as doors or side doors. Since the respective side door comprises the respective window frame, the respective side door is not formed as a frameless side door but as a so-called framed door or framed side door. The respective side window is transparent, that is to say light-transmitting, so that occupants, for example, sitting in the interior of the motor vehicle in its finished state can look out from the interior through the respective side window to the surroundings of the motor vehicle. In at least one respective position of the respective side window the respective side window is at least partially, in particular at least predominantly or fully arranged or capable of arrangement in the respective window aperture.

The method also comprises a second step, which is also referred to as step b). The second step is performed following the first step. In the second step the side doors are removed from the bodyshell. The side doors are therefore mounted on the bodyshell in the first step and in addition removed from the bodyshell again in the second step. The method further comprises a third step, which is also referred to as step c). The third step is performed following the second step. In the third step the doors are pre-assembled while the front door and the rear door are removed from the bodyshell. Here the side doors should preferably not be mounted on the bodyshell again between the second step and the third step. In the third step, and therefore while the side doors are removed from the bodyshell, the front door is fitted with the first side window and with a first trim, which is intended and serves to cover a first area of a B-pillar of the bodyshell. The first side window and the first trim are first components formed separately from one another and separately from the front door and separately from the rear door. The feature whereby the front door is fitted with the first trim and the first side window is taken to mean that the first side window and the first trim, which are at first removed or detached from the front door, are arranged and held, fixed or mounted on the front door.

In the third step the rear door is also fitted with the second side window and with a second trim, which is intended and serves to cover a second area of the B-pillar, in particular an area different from the first area. The second side window and the second trim are second components formed separately from one another and separately from the rear door and separately from the front door and separately from the first components. The feature whereby the rear door is fitted with the second trim and with the second side window is taken to mean, in particular, that the second side window and the second trim are arranged and held, fixed or mounted on the rear door. In addition, in the third step the second trim is finally positioned at least in relation to the rear door. The respective side door comprises a carcass, also referred to as a door carcass, for example, on which the respective side window and the respective trim are at least indirectly held or fixed. The respective door carcass here comprises a door frame, for example, on which the respective side window and the respective trim are at least indirectly held or fixed. Here, for example, in the third step the second trim is finally positioned in relation to the door carcass of the rear door. In addition, in the third step the second side window is finally positioned at least in relation to the second trim.

The feature whereby the second side window or the second trim is finally positioned is taken to mean that there is no further positioning of the second trim or the second side window subsequent to the final positioning.

The feature whereby the second trim is positioned, in particular finally positioned, is taken to mean that the second trim is purposely moved in relation to the rear door, in particular in relation to the carcass of the rear door, in order thereby to move the second side window and the second trim into a desired fitting position, in particular a final fitting position, in relation to the rear door, in particular in relation to the door carcass of the rear door. The feature whereby the second side window is positioned, in particular finally positioned, is taken to mean that the second side window is purposely moved in relation to the second trim and in so doing, for example, in relation to the rear door, in particular in relation to the carcass of the rear door, in order thereby to move the second side window into a desired fitting position, in particular a final fitting position, in relation to the second trim and at the same time in relation to the rear door, in particular in relation to the door carcass of the rear door. For example, the second trim is first finally positioned in relation to the carcass of the rear door, following which the second side window is finally positioned in relation to the second trim already situated in its fitted position. Here, for example, the second trim is aligned on the rear door, and the second side window is aligned on the second trim already situated in its fitted position. Once the second side window or the second trim is in the fitted position, in particular the final fitted position, the second side window or the second trim is fixed to the rear door and in the process of producing the motor vehicle preferably not moved again in relation to the rear door, particularly in relation to the door carcass of the rear door.

The method further comprises a fourth step, which is also referred to as step d). The fourth step is performed following the third step. In the fourth step the front door and the rear door are again mounted on that side of the bodyshell. In so doing the first trim and the first side window are preferably not removed from the front door, nor are the second side window and the second trim removed from the rear door between the third step and the fourth step.

The method further comprises a fifth step, which is also referred to as step e). The fifth step is performed following the fourth step. In addition, the fifth step is performed while the front door and the rear door are mounted on the side of the bodyshell. Here the side doors are preferably not removed from the bodyshell again between the fourth step and the fifth step. In the fifth step the first trim is finally positioned in relation to the second trim, and in the fifth step the first side window is finally positioned in relation to the first trim. The first trim is preferably first finally positioned in relation to the second trim, following which the first side window is finally positioned in relation to the already finally positioned first trim. The first trim is therefore aligned on the second trim, and the first side window is aligned on the already finally positioned first trim.

As already described with regard to the second trim and the second side window, final positioning of the first side window or the first trim is taken to mean that the first trim or the first side window is not positioned again following the respective final positioning of the first trim or the first side window. In the course of finally positioning the first trim, the first trim is moved in relation to the front door, in particular in relation to the door carcass of the front door, into a fitted position, in particular into a final fitted position, and fixed in the fitted position, in particular the final fitted position, on the front door, in particular on the door carcass of the front door. In the course of finally positioning the first side window, the first side window is moved in relation to the first trim and at the same time in relation to the front door, in particular in relation to the door carcass of the front door, into a fitted position, in particular into a final fitted position, and fixed in the fitted position, in particular the final fitted position, on the front door, in particular on the door carcass of the front door. In the process of producing the motor vehicle there is preferably no further positioning of the first side window or the first trim following the final positioning of the first side window or the first trim. The respective, in particular final, positioning is also referred to as alignment or final alignment. The respective, in particular final, positioning or alignment is a purposive positioning or purposive alignment. In other words, the positioning is a purposely performed operation, in the course of which the respective side window or the respective trim is purposely and therefore deliberately brought in a desired manner into the respective fitted position, in particular final fitted position, that is to say into a respective set position or set location. In particular, in positioning, the respective actual position of the respective component is compared with the desired set position of the respective component, the component being moved in such a way that an initially existing difference between the respective actual position and the set position is at least reduced, in particular eliminated.

The trims and the side windows are hereinafter also referred to as structural elements. The fitted position, in particular the final fitted position, is a desired set position or set location of the respective structural element, since when the respective structural element is situated in the desired set position, an especially advantageous gap dimension and therefore an especially advantageous joint pattern of the motor vehicle can be achieved, for example. This gives the motor vehicle to an especially advantageous visual appearance. The respective structural element for example at first occupies an actual position different from the set position, particularly in a state in which the respective structural element is removed and therefore detached from the respective side door, or in a state in which the respective structural element, although fitted to the respective side door, is not yet finally positioned. From the actual position the respective structural element is moved in relation to the respective side door, in particular in relation to the door carcass of the respective side door, in such a way that any existing difference between the actual position and the set position is at least reduced or even eliminated. The respective structural element is therefore moved, in particular starting from the respective actual position, in relation to the respective side door into the respective set position. In the set position the respective structural element is fixed, in particular finally fixed, to the respective side door, following which the respective structural element is not moved again in relation to the respective side door.

Since in the method according to the invention the second trim and the second side window are already finally positioned during pre-assembly of the door, there being no final positioning of the first side window and the first trim during pre-assembly of the door, and since the first side window and the first trim are finally positioned after pre-assembly of the door and in the fifth step, the components also referred to as structural elements can be positioned, that is to say aligned and therefore moved into the respective set position, for example, in a particularly time-saving and cost-effective manner by means of the method according to the invention. In addition, the structural elements, after the respective final positioning, have an especially advantageous alignment in relation to one another and in relation to the side doors, so that uniform gaps or joints and therefore an especially uniform a visually advantageous gap dimension or joint pattern can be produced. Since, furthermore, the first trim and the first side window are finally positioned while the side doors are mounted on the bodyshell and while the second trim and the second side window are already finally positioned, in the method according to the invention there is no mutually independent adjustment or alignment of the side doors or the trims and the side windows; rather the first trim is aligned, that is to say positioned, in relation to the already finally positioned second trim. Since, moreover, the first side window is finally positioned and therefore aligned in relation to the first trim, the first side window is aligned in relation to the second trim and therefore in relation to the second side window by way of the first trim, so as to ensure an especially advantageous alignment of all structural elements in relation to one another. This affords the following advantages:

appearance of especially high quality of the finished motor vehicle greatly increased precision of the gap dimensions compared to conventional solutions significantly smaller tolerances can be achieved than with conventional solutions avoidance of finishing work to correct a gap between the trims, also referred to as B-pillar trims cost saving, since a production of alignment tabs on a respective end of the respective door carcass may still be advantageous only for the rear door and can be dispensed with in the case of the front door.

In the finished state of the motor vehicle the aforementioned gap is located between the trims in the vehicle longitudinal direction, for example. Since the first trim is aligned and therefore positioned in relation to the second trim while the rear door constituting a rear side door is already mounted on the bodyshell and the second trim and the side window are finally positioned, the gap or its gap dimension can be adjusted particularly uniformly, so that the motor vehicle has an especially advantageous visual appearance. The front door is also referred to as the front side door.

It has proved particularly advantageous if the front door and/or the rear door are not mounted on the bodyshell again between steps b) and d). This allows the method to be performed in an especially time-saving and cost-effective manner.

In order to be able to achieve an especially advantageous visual appearance of the finished motor vehicle in a particularly time-saving and cost-effective manner, it is provided in a further embodiment of the invention that the side windows and the trims be finally positioned in such a way that following the respective final positioning respective outer sides of the windows and the trims facing outwards in the vehicle transverse direction be arranged flush with one another.

In an especially advantageous embodiment of the invention the side windows and the trims are finally positioned in such a way that following the respective final positioning a respective end edge of the respective side window facing the respective trim in a vehicle longitudinal direction is arranged without any outward overlap in a vehicle transverse direction relative to the respective trim, that is to say it is not overlapped by the respective trim. This is an especially time-saving and cost-effective way of giving the motor vehicle an especially advantageous visual appearance in its fully finished state. It is provided here, for example, to align the respective side window and/or the respective trim at least in the vehicle longitudinal direction (x), so as to be able to configure the aforementioned gap located between the trims in a vehicle longitudinal direction and/or a gap located between the respective side window and the respective trim in a vehicle longitudinal direction particularly uniformly. The method according to the invention represents an especially simple, time-saving and cost-effective way of achieving this.

In order to be able to align the respective trim in relation to the respective side window in an especially simple, time-saving and cost-effective manner, it is provided in a further embodiment of the invention that the respective side window be supported in a vehicle longitudinal direction on the respective trim by way of a support element formed separately from the respective side window and separately from the respective trim.

In a further embodiment of the invention the respective side window is a movable side window, which after the respective final positioning and in particular in the fully finished state of the motor vehicle is translationally movable, that is to say height-adjustable in a vehicle vertical direction in relation to the respective trim and in relation to the respective door carcass. This embodiment is based on the finding that above all the alignment of movable side windows is usually a time-consuming and cost-intensive process. The method according to the invention now makes it possible, however, to align and therefore position the movable side windows in a time-saving and cost-effective manner and with particular precision.

In order here to be able to align the respective side window in a time-saving and cost-effective manner, for example, it is provided in a further embodiment of the invention that the respective support element comprise a respective guide, along which the respective side window is guided in a translational movement. The support element is therefore formed, for example, as a guide fillet or guide rail.

Finally, it has proved particularly advantageous to purposely position the front door and the rear door in relation to the bodyshell in the first step. The feature whereby the side doors are purposely positioned in relation to the bodyshell is taken to mean that the side doors are not simply mounted on the bodyshell without paying attention to an alignment of the side doors in relation to the bodyshell, but instead, in purposely positioning the side doors in relation to the bodyshell, the side doors are purposely moved in relation to the bodyshell so that the side doors are purposely moved into a respective, desired set position in relation to the bodyshell and are therefore brought into the respective set position. An especially advantageous joint pattern can thereby be ensured between the side doors and adjoining components, so that the motor vehicle can be produced in an especially time-saving and cost-effective manner and with the appearance of high quality.

Further details of the invention emerge from the following description of a preferred exemplary embodiment together with the associated drawings.

DETAILED DESCRIPTION OF THE DRAWINGS

Figure 1:
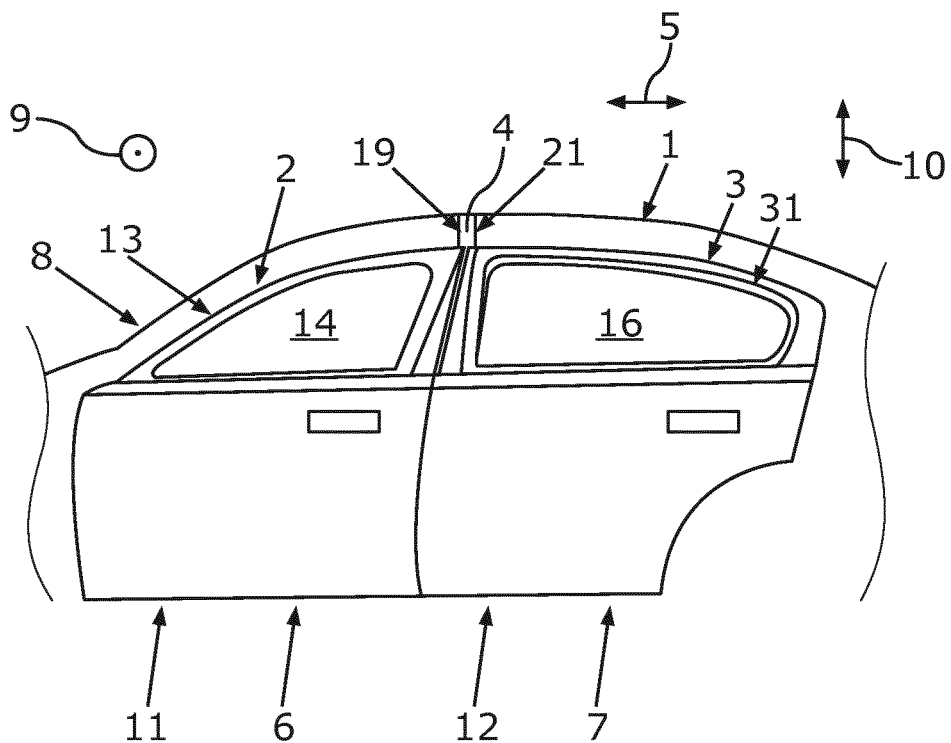
FIG. 1 shows a schematic side view of part of an integral bodyshell of a motor vehicle in the form of a car, a method according to the invention for producing the motor vehicle being described with reference to FIG. 1.

In the figures the same or functionally equivalent elements are provided with the same reference numerals.

FIG. 1 shows a schematic side view of part of an integral bodyshell 1 for a motor vehicle in the form of a car. The bodyshell 1 is also referred to as a body in white or body structure and is produced in the course of so-called body building, for example. The bodyshell 1 represented only very schematically in FIG. 1 comprises a front door aperture 2 and a rear door aperture 3. In the finished state of the motor vehicle persons are able to enter and exit the vehicle interior via the door apertures 2 and 3. The door aperture 2 is defined in the rearward vehicle longitudinal direction at least partially, in particular at least predominantly or entirely by a body or vehicle pillar of the bodyshell 1 in the form of the B-pillar 4. The rear door aperture 3 is defined in the forward vehicle longitudinal direction at least partially, in particular at least predominantly or entirely by the B-pillar 4. Here the vehicle longitudinal direction in FIG. 1 is illustrated by a double arrow 5, the door apertures 2 and 3 being arranged one behind the other or successively in the vehicle longitudinal direction.

Figure 3:
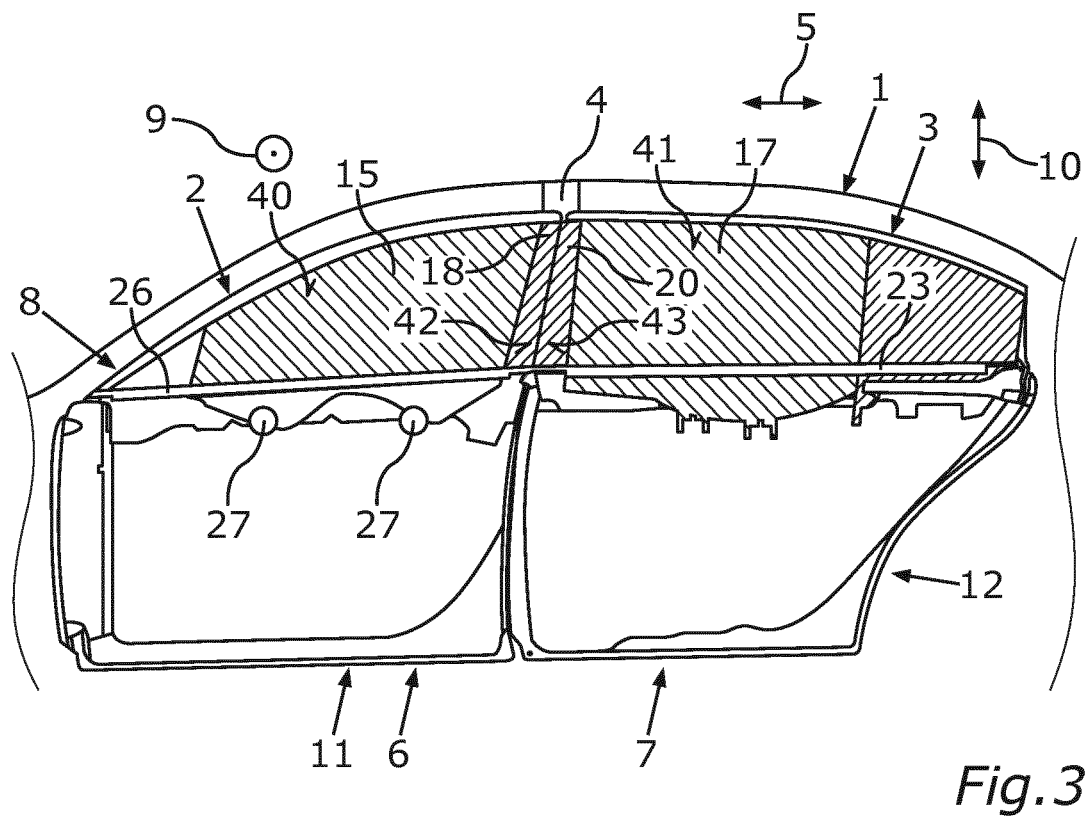
FIG. 3 shows a further schematic side view of part of the bodyshell.

A method for producing the motor vehicle is described below with reference to FIGS. 1 and 3. In a first step of the method a front door 6, also referred to as a front side door or first side door, and a rear door 7, also referred to as a second side door or rear side door, are mounted, in particular reversibly and detachably mounted, on the same side 8 of the bodyshell 1. In other words, in the first step of the method the side doors, initially removed and therefore detached from the bodyshell 1, are at least indirectly mounted, in particular reversibly and detachably mounted, on the side 8 of the bodyshell 1 and therefore on the bodyshell 1 itself, in particular in such a way that following the first step the respective side door is pivotally held on the bodyshell 1. In so doing the respective side door is mounted on the bodyshell 1 in such a way, for example, that the front door aperture 2 is outwardly at least partially covered in a vehicle transverse direction and therefore closed by the front door 6, and the rear door aperture 3 is outwardly at least partially covered in a vehicle transverse direction and therefore closed by the rear side door (rear door 7). The vehicle transverse direction here in FIG. 1 is illustrated by a double arrow 9 and runs perpendicular to the vehicle longitudinal direction. The vehicle longitudinal direction is also referred to as the x-direction, while the vehicle transverse direction is also referred to as the y-direction. Running perpendicular to the vehicle longitudinal direction and perpendicular to the vehicle transverse direction is the vehicle vertical direction, which in FIG. 1 is illustrated by a double arrow 10 and is also referred to as the z-direction.

Figure 2:
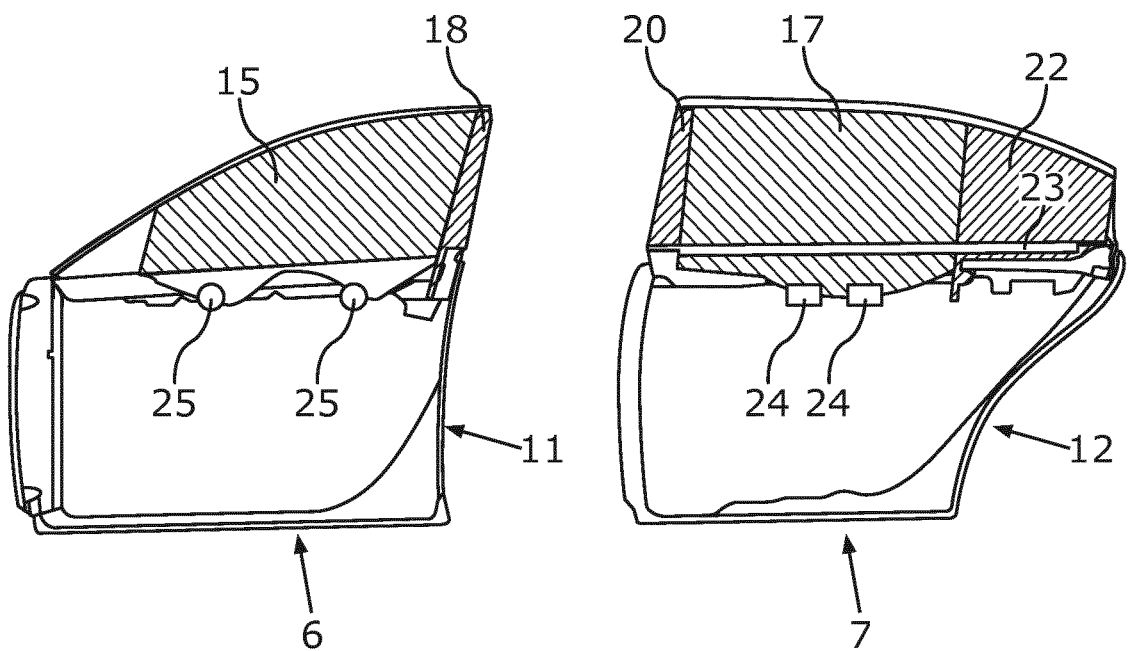
FIG. 2 shows a schematic side view of both a front door and a rear door of the motor vehicle, which are mounted on the bodyshell in the course of the method.

It can be seen from FIG. 1 that the respective side door comprises a door carcass 11 or 12 respectively, also referred to simply as a carcass. The respective door carcass 11 or 12 can also be seen particularly clearly from FIG. 2 and comprises a door frame, for example. It can be seen particularly clearly from FIGS. 1 and 2 that the front door 6 comprises a first window frame 13, which at least partially, in particular at least predominantly or completely defines a first window aperture 14 for a first side window 15 (FIG. 2). The rear door 7 comprises a second window frame 31, which at least partially, in particular at least predominantly or completely defines a second window aperture 16 for a second side window 17 (FIG. 2). In the first step the side doors are mounted in particular on the side 8 and therefore on the bodyshell 1 while the side windows 15 and 17 are still removed or detached or separated from the side doors, that is to say while the side windows 15 and 17 are not yet held or fixed to the side doors.

In a second step of the method following the first step the side doors are removed from the bodyshell 1. In a third step of the method following the second step the doors are assembled while the side doors are removed and therefore detached from the bodyshell 1.

The pre-assembly of the doors is illustrated in FIG. 2. During assembly of the doors, the front door 6 is fitted with the first side window 15 and with a first trim 18 for covering a first area 19 (FIG. 1) of the B-pillar 4. This means that the side window 15 and the trim 18 are held or fixed on the separately formed front door 6. In particular, a respective installation of the side window 15 and the trim 18 on the front door 6 is performed without adjustment, that is to say without the side window 15 and the trim 18 being purposely aligned in relation to one another and/or in relation to the front door 6. This involves a pre-positioning of the trim 18 and a pre-positioning of the side window 15, for example. A channel fillet is preferably not attached during pre-assembly of the doors.

During pre-assembly of the doors, the rear door 7 is fitted with the second side window 17 and with a second trim 20 for covering a second area 21 of the B-pillar 4, so that, for example, the side window 17 and the trim 20 are held or fixed on the rear door 7. In addition, during pre-assembly of the doors the rear door 7 is fitted with a further side window 22. During pre-assembly of the doors, the second trim 20 is moreover finally positioned at least in relation to the rear door 7, in particular in relation to the door carcass 12, and the second side window 17 is finally positioned at least in relation to the second trim 20.

The side window 15 is a movable side window, which in the finished state of the motor vehicle is translationally movable and therefore height-adjustable in the vehicle vertical direction in relation to the front door 6, in particular in relation to the door carcass 11. The side window 17 is also a movable side window, which in the fully finished state of the motor vehicle is translationally movable and therefore height-adjustable in the vehicle vertical direction in relation to the rear door 7, in particular in relation to the door carcass 12. In contrast to this, the side window 22 is a fixed or static side window, which in the finished state of the motor vehicle is at least indirectly fixed to the door carcass 12 and therefore immovable in relation to the door carcass 12. For example, during pre-assembly of the doors the side window 22 is positioned, in particular finally positioned, at least in relation to the rear door 7, in particular in relation to the door carcass 12, which is achieved, for example, by at least one or more stamped sheet-metal tabs.

The final positioning and therefore alignment of the trim 20 in relation to the rear door 7, in particular in relation to the door carcass 12, is achieved, for example, by at least one or more stamped sheet-metal tabs. The final positioning and therefore alignment of the side window 17 is achieved in a vehicle longitudinal direction, for example, by a stop on or towards the trim 20. In the third step a channel fillet of the rear door 7, for example, is fitted onto the latter, in particular onto the door carcass 12, in particular once the side window 17 and the trim 20 and preferably also the side window 22 have been finally positioned and thereby aligned.

The channel fillet of the rear door 7 is represented schematically in FIG. 2 where it is denoted by 23. The channel fillet 23, for example, at least partially defines a window channel, into which the side window 17 can be moved at least partially downwards in the vehicle vertical direction when the side window 17 is being moved downwards and therefore lowered in the vehicle vertical direction in relation to the door carcass 12.

A window lift device is provided in order to be able to move the side window 17, for example, in the vehicle vertical direction in relation to the door carcass 12. The window lift device comprises, for example, at least one or more drivers 24, which are translationally movable in the vehicle vertical direction in relation to the door carcass 12. During pre-assembly of the doors, the side window 17 is connected to the drivers 24 by respective gripping jaws, for example. In the released or not yet tightened state of the gripping jaws the side window 17 can still be moved and therefore positioned, in particular finally positioned, in relation to the door carcass 17 and in relation to the trim 20. In the course of final positioning the trim 20 and the side window 17 are moved into respective final fitted positions, also referred to as set positions. When the side window 17 is situated in its final fitted position, the gripping jaws are tightened, for example, so that the side window 17 is fixed for example in relation to the door carcass 12 and/or in relation to the trim 20 or in relation to the drivers 24, thereby fixing the final fitting position of the side window 17.

After tightening the gripping jaws, a door trim panel, for example, is fitted to the door carcass 12, the door trim panel outwardly or inwardly covering the drivers 24, for example, in the vehicle transverse direction. The gripping jaws can therefore be tightened only prior to fitting of the door trim panel. Although the side window 15 and the trim 18 can be roughly pre-positioned during the pre-assembly of the doors, particularly in relation to one another and/or in relation to the door carcass 11, the side window 15 and the trim 18 are preferably not finally positioned during pre-assembly of the door.

In order to be able to move the side window 15 translationally in relation to the door carcass 11 in the vehicle vertical direction, a window lift device, which comprises at least one or more drivers, is also provided on the front door 6, for example. The side window 15 here is connected, for example, to the drivers, denoted by 25 in FIG. 2, which are assigned to the front door 6, the preceding and following remarks with regard to the drivers 24 also then being implicitly applicable to the drivers 25 relating to the side window 15, and vice versa. It can be seen from FIGS. 1 and 2 that the pre-assembly of the door as described is performed while the side doors are removed and therefore detached or separated from the bodyshell 1.

In a fourth step of the method following the third step, the side doors are again mounted on the side 8 of the bodyshell 1 and therefore on the bodyshell 1. In a fifth step of the method following the fourth step—while the side doors are mounted on the side 8 of the bodyshell 1 and therefore on the bodyshell 1 itself—the first trim 18 is finally positioned in relation to the second trim 20, and the first side window 15 in relation to the first trim 18. The fourth step and the fifth step can be seen, in particular from FIG. 3.

The fourth step and the fifth step are performed, for example, in the course of a so-called door installation, which can be performed on a main motor vehicle production line. In the fourth step the trim 18 is aligned and positioned, in particular finally positioned, at least in relation to the trim 20, something which can be accomplished to particular advantage by performing the fifth step while the side doors are simultaneously held on the side 8 of the bodyshell 1 and therefore on the bodyshell 1 itself.

The side door 6, also, may comprise a window channel, into which the side window 15 can be at least partially moved when the side window 15 is moved downwards in the vehicle vertical direction and therefore lowered in relation to the door carcass 11. The window channel of the side door 6 is defined at least partially, for example, by the aforementioned channel fillet 26, denoted by a driver 24 in FIG. 3, which during installation of the door, particularly in the fourth step or in the fifth step or following the fifth step, is attached, that is to say fitted at least indirectly on the door carcass 11. For example, the side window 15 is aligned and therefore positioned, in particular finally positioned, by means of tensioning screws 27 via the window channel of the front door 6, defined at least partially by the channel fillet 26, the tensioning screws 27 taking the form of hook-screws, for example.

Figure 5:
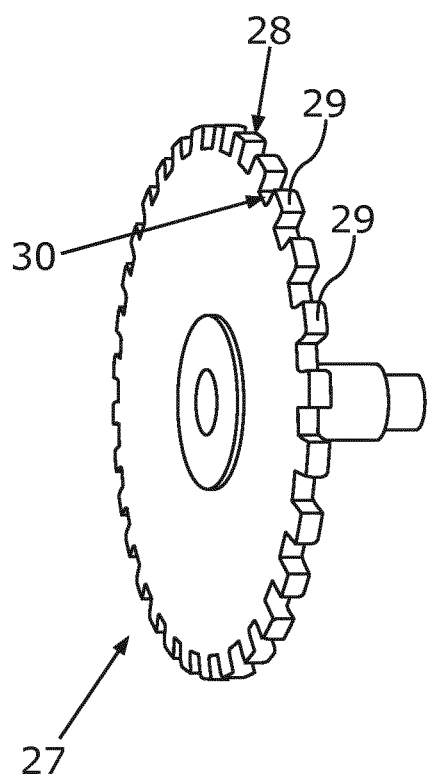
FIG. 5 shows a schematic perspective view of a clamping screw in the form of a hook-screw.

One of the tensioning screws 27 (hook-screw) is shown in a schematic perspective view in FIG. 5. It can be seen from FIG. 5 that the respective tensioning screw 27 has a toothing 28 facing outwards in a radial direction of the tensioning screw 27, the teeth 29 of which are spaced at a distance from one another in the circumferential direction of the tensioning screw 27, so that at least or precisely one tooth gap 30 of the toothing 28 is arranged between each two teeth 29 immediately succeeding one another in the circumferential direction of the tensioning screw 27. A tool for turning the tensioning screw 27, for example, can thereby be inserted into the window channel of the front door 6 from the top in the vehicle vertical direction and further into the respective tooth gap 30, so that the tool can interlock positively with the toothing 28 and therefore with the respective tensioning screw. The tensioning screw 27 can thereby be turned by means of the tool.

The side window 15 is aligned and therefore positioned in relation to the trim 18, for example, while the tensioning screws have not yet been tightened but are still slackened. The side window 15 here is positioned in such a way that the side window 15 is moved in relation to the trim 18 and thereby into a desired set position. Once the side window 15 has reached the desired set position, the tensioning screws 27 are tightened by inserting the tool into the respective tooth gap 30 in the manner described and turning and thereby tightening the tensioning screw by means of the tool in the manner described. The set position of the side window 15 is thereby fixed and the side window 15 is finally fitted in its desired set position. If necessary, a trim for at least partially covering the window frame 13 or 15 is adjusted.

It can be seen all in all that the tensioning screws 27 can be tightened via the window channel, so that the movable side window 15 can be aligned and therefore finally positioned in relation to the trim 18 by way of the window channel of the front door 6, using the tensioning screws 27. The method described allows precise gap dimensions to be set between the side windows 15 and 17 and the trims 18 and 20 in a time-saving and cost-effective manner.

Figure 4:
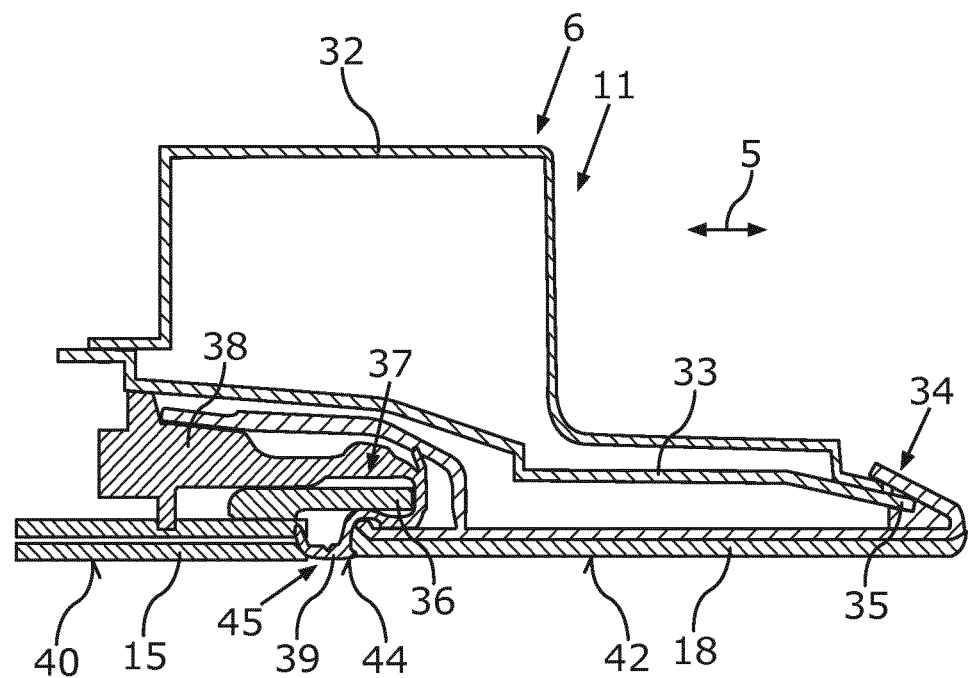
FIG. 4 shows a schematic sectional view of a portion of the front door.

FIG. 4 by way of example shows the front door 6 in a sectional view along a plane of section that runs in through the B-pillar 4 in the vehicle vertical direction. The remarks with regard to the front door 6 can also be implicitly applied to the rear door 7, and vice versa. It can be seen from FIG. 4 that the front door 6, in particular its door carcass 11, comprises a door inner panel and outer panel 33, also referred to as a door shut panel, the door inner panel 32 being at least partially, in particular at least predominantly or completely covered outwardly in the vehicle transverse direction, by the outer panel 33. The door inner panel 32 and the outer panel 33 are carcass parts of the door carcass 11 and are connected together. It can also be seen from FIG. 4 that the outer panel 33 at its end 34 comprises a stamped tab 35, for example, on which the trim is aligned in the vehicle longitudinal direction (double arrow 5). This allows the trim 18 to be aligned and therefore positioned, particularly in the vehicle longitudinal direction, in relation to the door carcass 11.

It can also be seen from FIG. 4 that a guide rail 36, which is accommodated at least partially in a corresponding guide 37 of a guide element 38, is assigned to the side window 15. The guide rail 36 is connected to the side window 15, for example. The guide rail 36, the guide 37 and the guide element 38 serve to guide the side window 15 in the vehicle vertical direction relative to the door carcass 11, when the side window 15 is translationally moved in the vehicle vertical direction in relation to the door carcass 11. The guide rail 36 is formed from a plastic, for example, and/or adhesively bonded to the actual side window 15 itself or to at least one window element of the side window 15. The guide element 38 is formed separately from the trim 18 and separately from the side window 15 and fixed at least indirectly to the door carcass 11. In the exemplary embodiment shown in FIG. 4 the guide element 38 functions as a support element, on which both the side window 15 and the trim 18 are supported at least indirectly, in particularly directly, in the vehicle longitudinal direction. The side window 18 is therefore supported on the trim 18 in a vehicle longitudinal direction by way of the guide element 38, in particular by way of a stop 39 formed by the guide element 38.

It can also be seen particularly clearly from FIG. 4 that the respective side window 15 or 17 is aligned in relation to the respective trim 18 or 20 in such a way that after the respective final positioning a respective outer side 40 or 41 of the respective side window 15 or 17, facing outwards in the vehicle transverse direction, is arranged flush to or with a respective outer side 42 or 43 of the respective trim 18 or 20 facing outwards in the vehicle transverse direction. Here the outer sides 40, 41, 42 and 43 are preferably also arranged flush with an outer side 44 of the stop 39 facing outwards in the vehicle transverse direction. This is a time-saving and cost-effective way of ensuring a particularly advantageous visual appearance of the motor vehicle.

The method serves to combine the advantages of concepts for the adjustment of framed doors with the advantages of concepts for the adjustment of frameless doors. The rear side door can be adjusted in its sub-system by finally positioning the side window 17 and the trim 20 in the manner described. The requisite operating steps for this are shifted to the separate door pre-assembly, so that no additional volumes are catered for on the main conveyor, also referred to as the main assembly line. There is no longer any need to match a rear window frame trim of the rear door 7 to the trim 20 in so-called "works finishing", since this can be finalized in the pre-assembly of the door. In the case of the front side door the trim 18 and the side window 15 are only provisionally adjusted during pre-assembly of the door and only finally positioned or set on the main assembly line. The advantage to this is that the final positioning of the side window 15 and the trim 18 can be undertaken after a final fine adjustment of the side doors in works finishing. All tolerancing issues affecting any joints on the trims 18 and 20 can thereby be eliminated.

It can also be seen particularly clearly from FIG. 4 that the side windows 15 and 17 and the trims 18 and 20 are finally positioned in such a way that, following the respective final positioning, a respective end edge 45 of the respective side window 15 or 17 facing the respective trim 18 or 20 in the vehicle longitudinal direction is arranged without any outward overlap in the vehicle transverse direction relative to the respective trim 18 or 20, so that the respective trim 18 or 20 does not outwardly overlap the end edge 45 in the vehicle transverse direction, but instead the respective trim 18 or 20 closely buts against the end edge 45 in the vehicle longitudinal direction. In particular, the respective side window 15 or 17 is arranged entirely without any overlap in the vehicle transverse direction relative to the respective trim 18 or 20.

These run to where the side window 15 or 17 sinks into a seal. This is the case, for example, on a roof frame trim and mirror triangle. There, however, no visible gaps are provided. The method serves to eliminate or at least minimize finishing operations, so that the motor vehicle can be produced in a time-saving and cost-effective manner. It is possible to achieve significantly more precise gap dimensions compared to conventional adjustment concepts in all readable, that is to say visible joints, giving the motor vehicle an appearance of especially high quality.

LIST OF REFERENCE CHARACTERS 1 bodyshell
2 door aperture
3 door aperture
4 B-pillar
5 double arrow
6 front door
7 rear door
8 side
9 double arrow
10 double arrow
11 door carcass
12 door carcass
13 window frame
14 window aperture
15 side window
16 window aperture
17 side window
18 trim
19 area
20 trim
21 area
22 side window
23 channel fillet
24 driver
25 driver
26 channel fillet
27 tensioning screw
28 toothing
29 tooth
30 tooth gap
31 window frame
32 door inner panel
33 outer panel
34 end
35 tab
36 guide rail
37 guide
38 guide element
39 stop
40 outer side
41 outer side
42 outer side
43 outer side
44 outer side

What is claimed is:

1. A method for producing a motor vehicle, comprising the steps of:
a) mounting of a front door, wherein a first window frame of the front door defines a first window aperture for a first side window, and a rear door, wherein a second window frame of the rear door defines a second window aperture for a second side window, on a same side of an integral bodyshell of the motor vehicle;
b) following step a), removing the front door and the rear door from the bodyshell;
c) following step b), pre-assembling of the front and rear doors while the front door and the rear door are removed from the bodyshell, wherein the pre-assembling includes:
fitting the front door with the first side window and with a first trim for covering a first area of a B-pillar of the bodyshell;
fitting the rear door with the second side window and with a second trim for covering a second area of the B-pillar of the bodyshell; and
finally positioning the second trim in relation to the rear door and the second side window;
d) following step c), mounting the front door and the rear door on the same side of the bodyshell; and
e) following step d) and while the front door and the rear door are mounted on the same side of the bodyshell:
final positioning of the first trim in relation to the finally positioned second trim of the mounted rear door; and following the final positioning of the first trim in relation to the finally positioned second trim, aligning and positioning the first side window in relation to the finally positioned first trim to a set position while a tensioning screw is not tightened and then final positioning of the first side window in relation to the finally positioned first trim at the set position by tightening the tensioning screw which fixes the first side window in the set position.

2. The method according to claim 1, wherein the front door and the rear door are not mounted on the bodyshell again between steps b) and d).

3. The method according to claim 1, wherein the first and second side windows and the first and second trims are finally positioned such that following the respective final positionings, respective outer sides of the first and second side windows and the first and second trims facing outwards in a vehicle transverse direction are disposed flush with one another.

4. The method according to claim 1, wherein the first and second side windows and the first and second trims are finally positioned such that, following the respective final positionings, a respective end edge of the first and second side window facing the respective first and second trims in a vehicle longitudinal direction is disposed without any outward overlap in a vehicle transverse direction relative to the respective first and second trim.

5. The method according to claim 1, wherein the first and second side windows are each a moveable side window which, after the respective final positioning, is translationally moveable in a vehicle vertical direction in relation to the respective first and second trim.

6. The method according to claim 1, wherein in step a), the front door and the rear door are moved into a respective set position in relation to the bodyshell.

7. The method according to claim 1, the first and second side windows are supported in a vehicle longitudinal direction on the respective first and second trims by a respective support element that is formed separately from the first and second side windows and the first and second trims.

8. The method according to claim 7, wherein each of the respective support elements comprises a guide along which the respective first and second side window is guided in a translational movement.

* * * * *